July 17, 1962　　　J. E. TRIPP ETAL　　　3,044,456
PROPORTIONING VALVE

Filed May 4, 1961　　　　　　　　　　　　　3 Sheets-Sheet 1

INVENTORS
Joseph E. Tripp, Walter H. Witzel
BY
Ezekiel Wolf, Wolf & Greenfield

UNITED STATES PATENT OFFICE 3,044,456
Patented July 17, 1962

3,044,456
PROPORTIONING VALVE
Joseph E. Tripp, Bolton, and Walter H. Witzel, Sudbury, Mass., assignors to Proval Corp., Worcester, Mass., a corporation of Massachusetts
Filed May 4, 1961, Ser. No. 107,714
10 Claims. (Cl. 123—41.42)

This invention relates to means for adding a material in relatively small quantities to a liquid which is handled in relatively large quantities. The invention is embodied in a self-cleaning proportioning valve for combining the liquid and additive. Because the valve is self-cleaning, it is particularly suitable for use in a system handling materials that have a tendency to clog small passages.

An example of a material that tends to clog small passages is concentrated sodium silicate solution. Whenever a concentrated sodium silicate solution flows through a passage and is exposed to the presence of even small quantities of air such as the dissolved air in a typical water system, the silicate builds up on the surfaces of the passage. This build up continues until the small passage or a very small orifice in it becomes either clogged or too small for proper operation. Obviously numerous other materials behave in a like manner and give rise to the same or similar problems.

One application of this invention is in a home or industrial water conditioning system. The proportioning valve of this invention may readily be connected into a water system to introduce desired amounts of sodium silicate as a conditioning agent. Another application of this invention is in a corrosion resisting system for marine engines. By means of this invention an additive may be introduced into the engine cooling system to resist engine corrosion.

The primary object of this invention is to provide a relatively simple and compact proportioning valve for controlling the ratio between a main liquid and an additive introduced into it.

Another important object of this invention is to provide a proportioning valve which includes as a part thereof a device for varying the ratio of the main liquid and additive.

To accomplish these and other objects, this invention includes among its important features a valve housing provided with inlet and outlet fittings which enable the housing to be readily connected in the line of a liquid to which the additive is to be introduced. Intermediate to the inlet and outlet fittings is a movable restrictor which creates a low pressure region in the housing. A metering orifice is formed in the wall of the housing at the low pressure region, and the additive is introduced into the housing through it. The restrictor in the housing is adjustable so that the intensity of pressure in the low pressure region may be changed. Carried on a movable rod in the housing is a needle which is aligned with the orifice. The needle moves out of the orifice when liquid flow starts and falls into the orifice when flow ceases. The needle serves to clean the orifice periodically to remove any build up of the additive in it during the course of operation.

In one embodiment of this invention, the adjustable restrictor is enclosed in a portion of the housing having a frustoconical configuration and the restrictor is similarly shaped with its outer surface having precisely the same taper as that of the housing portion. Therefore, the restrictor and housing wall define an annular passage having a uniform height throughout its length in all positions of the restrictor. Adjustment of the restrictor serves to change the cross sectional area of the passage by varying its height. As a result, laminar flow is maintained in the passage defined by the restrictor and the surrounding portion of the housing. This type of adjustable restrictor enables the ratio of the additive and main line liquid to remain uniform over a wide range of flow. As a result, this device is particularly suitable for use in a domestic water softening system for introducing sodium silicate in a fixed ratio into the water supply.

In another embodiment of this invention particularly suitable for use in a corrosion preventative installation for marine engines, a cruise control valve is incorporated into the device, which serves to prevent additive from entering the cooling system when the marine engine reaches a selected cruising speed. By this additional feature, the use of the additive is limited to the times when it is most effective in preventing corrosion.

These and other objects and features of this invention, along with its incident advantages, will be better understood and appreciated from the following detailed description of two embodiments thereof, selected for purposes of illustration and shown in the accompanying drawing, in which.

Figure 1:
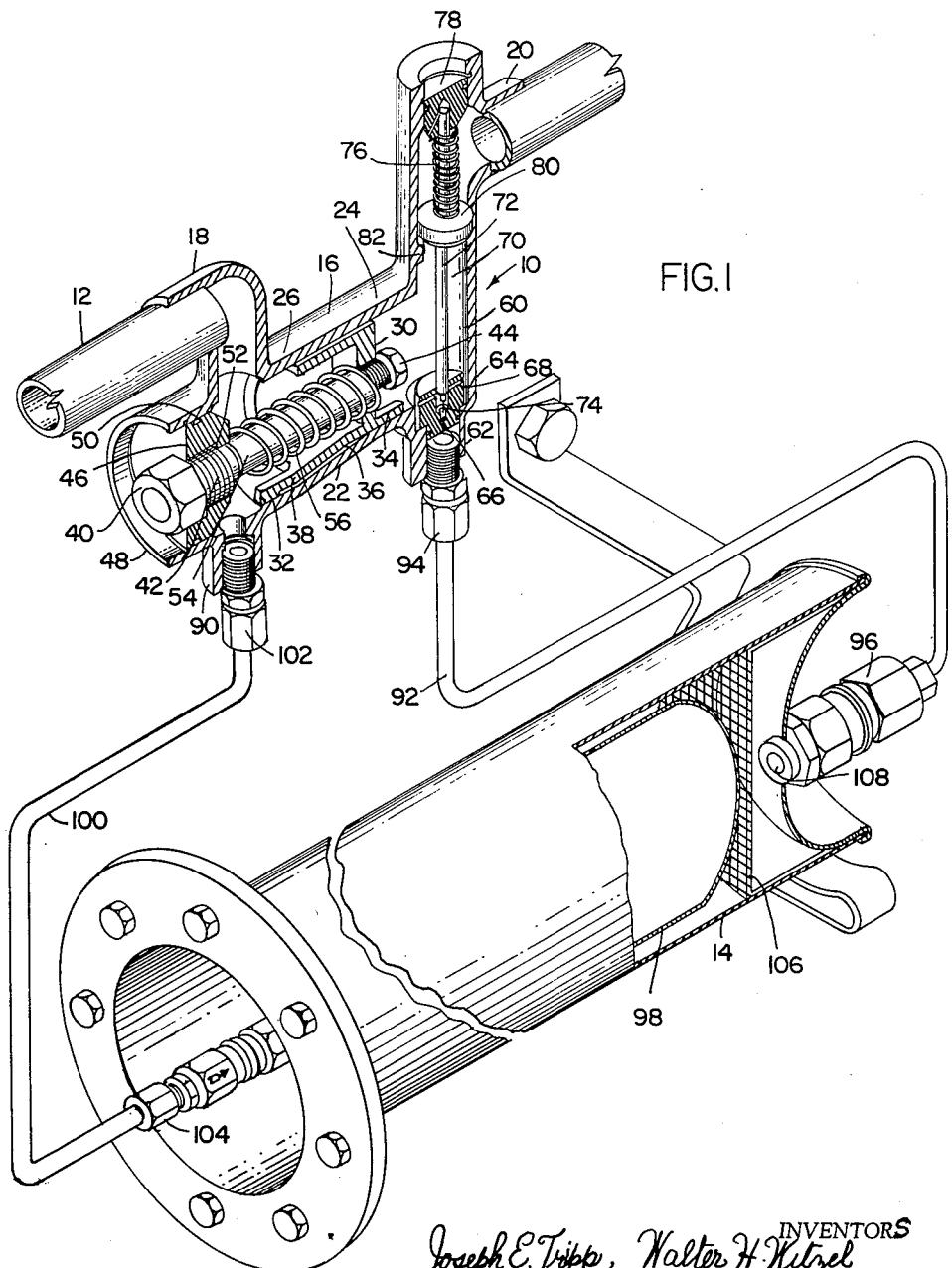
FIG. 1 is a cross sectional perspective view of a proportioning valve disposed in a system particularly suitable for use in a domestic water system.

In FIG. 1 a proportioning valve 10 is shown to interrupt a line 12 carrying a liquid into which an additive is to be supplied. The additive is stored within a tank 14. The proportioning valve 10 shown in this figure is particularly suitable for use in a domestic water supply line to introduce sodium silicate into the water as a softening agent.

The proportioning valve 10 includes a housing 16 having a main inlet fitting 18 and an outlet fitting 20 which are connected to the main line 12 so as to direct the main line liquid through the housing 16. In the center of the housing 16 between the fittings 18 and 20 is a waist section 22, frustoconical in shape, and having a smaller diameter at the downstream end 24 than at the upstream end 26. Disposed in the waist section 22 of the housing 16 is a restrictor 28 in the form of a tapered sleeve. The tapered sleeve 28 is closed at end 30 and is provided with ribs 32 and 34 which support the sleeve concentrically with the waist 22 of the housing. The sleeve 28 and waist 22 together define a metering annulus or passage 36. Because the taper of the waist section 22 and that of the sleeve 28 are the same, regardless of the position of the sleeve 28 in the waist 22, the radial height of the metering annulus or passage 36 is uniform from inlet to outlet end. The actual uniform height of the annulus is determined by the position of the sleeve or restrictor 28 in the waist.

The position of the sleeve 28 in the tapered section 22 of the housing 16 is controlled by the adjustment nut 40 fitted on the end of a shaft 42 whose other end is secured to the end wall 30 of the sleeve. A nut 44 retains the sleeve on the shaft. A collar 46 is fitted into the end 48 of the housing 16 and serves to close that end. An O-ring 50 forms a seal between the housing and the collar. The collar 46 is provided with a threaded opening 52 which receives the threaded portion 54 of the shaft 42. Thus, by turning the adjustment nut 40 the shaft 42 moves axially in the housing 16 and carries the sleeve 28 with it. A coil spring 56 is wound about the shaft 42 and bears against the inner surface of end wall 30 and the collar 46. The spring serves to keep a relatively constant force between the sleeve 28 and collar 46 eliminating the backlash between the threads of shaft 42 and collar 46.

In the downstream or outlet end 60 of the housing 16 is a second inlet fitting 62 in which is positioned a collar 64 provided with a small metering orifice 66. All material entering the housing 16 through the fitting 62 must pass through the orifice 66. The bore in the collar 64 which forms the orifice terminates at its upper end in several radial passages 68 which provide access to the interior of the housing 16 from the orifice.

An orifice needle lifting assembly 70 includes a carrying rod 72 and a needle 74 which is adapted to extend into the orifice 66 under the influence of spring 76 on the upper end of the rod 72. The coil spring 76 extends between plug 78 and disc 80 and urges the rod 72 in a downward position as shown in FIG. 1. A passageway 82 formed in the upstanding portion of the housing 16 serves as a guide for the disc 80. It will be noted in the drawing that the lower end of the rod 72 extends into the bore of the collar 64. When the rod 72 is raised, the narrow lower portion of the rod 72 is removed from the plane of the radial passages 68 so as to permit the unobstructed flow of material into the housing through the orifice, bore and the radial passages 68. It will also be noted that the radial passages are so positioned as to allow immediate and thorough mixing of the silicate with the water. It will be recognized that when flow occurs through the housing toward the outlet fitting 20, this flow will act upon the disc 80 against the bias of the spring 76 to lift the rod 72, thus removing the needle 74 from the orifice 66 and at the same time permitting flow through the guide 82.

The structure of the proportioning valve 10 is completed by a small outlet fitting 90 formed at the inlet end of the housing radially opposite the fitting 18 connected to the line 12. It will be noted in the drawing that a portion of the liquid entering the housing 16 through the fitting 18 may by-pass the sleeve 28 and metering annulus 36 and leave the housing 16 through the fitting 90.

The manner in which the valve may be employed in a domestic water system to introduce an agent such as sodium silicate into the water will now be described. As suggested above, the tank 14 houses the supply of sodium silicate to be introduced into the water carried through the line 12. A duct 92 is provided with couplings 94 and 96 at its ends to connect it to the inlet fitting 62 and the tank 14. Thus, the duct 92 is used to convey the sodium silicate stored within the tank 14 to the housing 16 through the orifice 66.

Disposed within the tank 14 is a flexible membrane 98 in the form of a bag that serves to divide the tank 14 into two compartments. The interior of the bag communicates with the line 12 by means of the duct 100 connected at one end by means of coupling 102 to the fitting 99 and at the other end to the tank 14 by coupling 104. The coupling 104 serves to direct liquid from the duct 100 to the interior of the bag and prevents the liquid from mixing with the silicate in the tank exterior of the bag. A screen 106 prevents the membrane 98 when expanded from covering the inlet 108 of coupling 96.

When no flow occurs in line 12, the pressure throughout the system is uniform and the needle 94 is disposed in the orifice 66. When flow occurs the pressure in the tank 14 remains proportional to the line pressure by virtue of the connection of duct 100 to the bag formed by membrane 98. The flow of water through the housing 16 and more particularly through the annular passage 36 creates a low pressure region at the outlet end 60 of the housing. The flow of water through the housing also lifts the disc 80 up in the guide 82 and removes the needle 74 from the orifice 66. Thus, the sodium silicate in tank 14 may be conveyed through the duct 92, orifice 66 and radial passages 68 to the low pressure region of the housing 16.

The pressure drop across the metering annulus formed by the restrictor 28 is proportional to the pressure drop across the orifice 66 as it will be recognized that the pressure in the duct 92 is proportional to the pressure at the inlet end 26 of the waist section 22 of the housing 16. The proportionality of pressures is maintained by the continued application of line pressure to the tank 14 through duct 100. The pressure drop across the orifice 66 causes the sodium silicate stored within the tank to pass through the orifice to the interior of the housing 16 where it is picked up by the main flow of water through line 12 and carried through the domestic system.

To vary the ratio of sodium silicate to water, the adjustment nut 40 is turned to move the restrictor in the tapered portion 22 of the housing. By moving the restrictor 28 to the left as viewed in FIG. 1, the annular passage 36 between the restrictor and frustoconical waist section 22 is enlarged, thus reducing the pressure drop across the sleeve 28 and correspondingly lessening the pressure drop across the orifice 66. As a result, a smaller quantity of sodium silicate will flow from the tank to the discharge end 60 of the housing with a given flow in line 12. Alternatively, to increase the amount of sodium silicate introduced into the water line, the sleeve 28 is moved to the right as shown in FIG. 1 to create a greater pressure drop between the inlet and outlet ends of the proportioning valve housing. Throughout the use of the system, the orifice 66 is cleaned by the needle 74 whenever the flow of water stops. Thus, no appreciable amounts of sodium silicate may build up in the orifice 66 to restrict the flow of the material to the housing 16.

Figure 2:
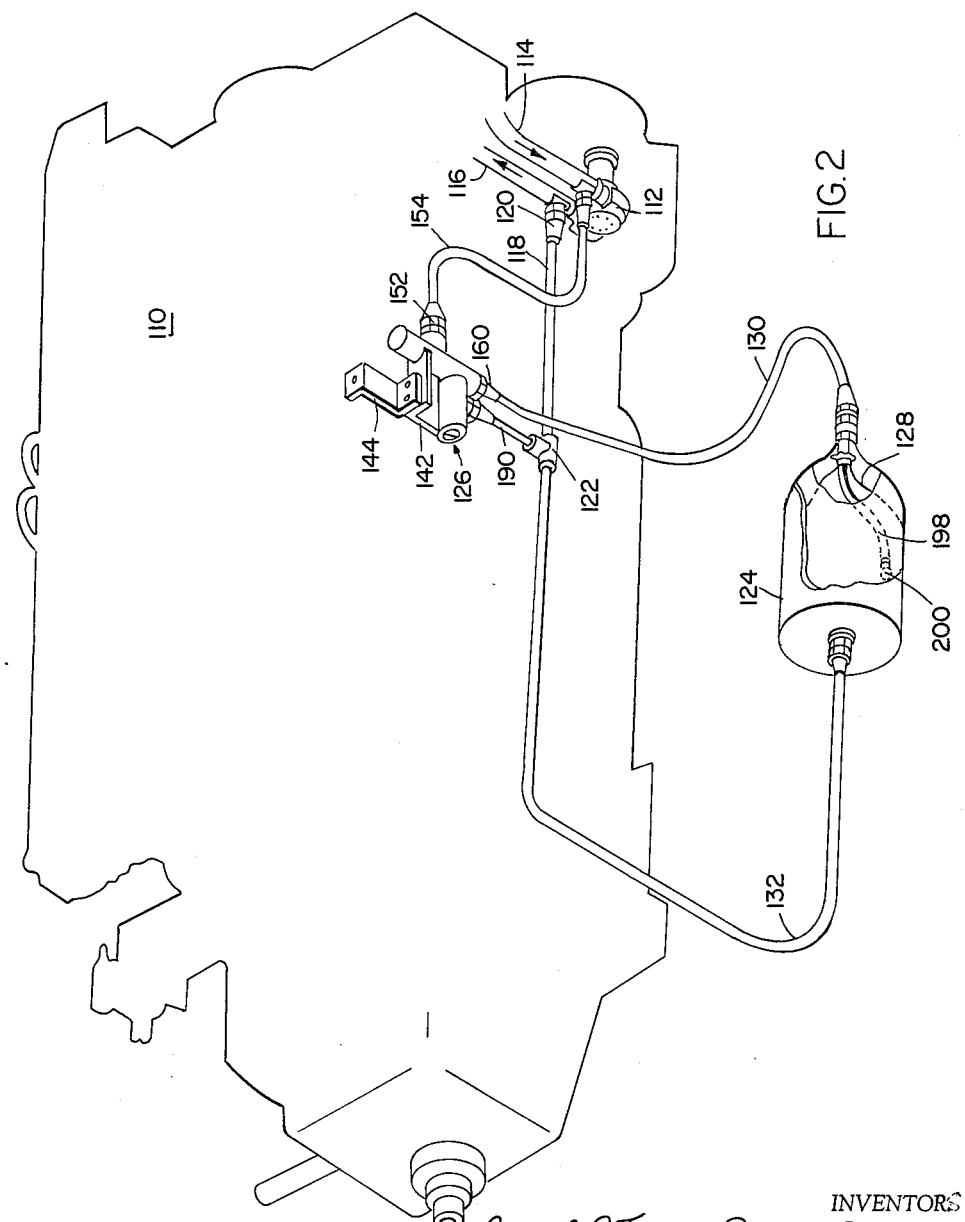
FIG. 2 is a perspective view of the assembly of this invention connected as a corrosion resisting installation into the cooling system of a marine engine.
Figure 3:
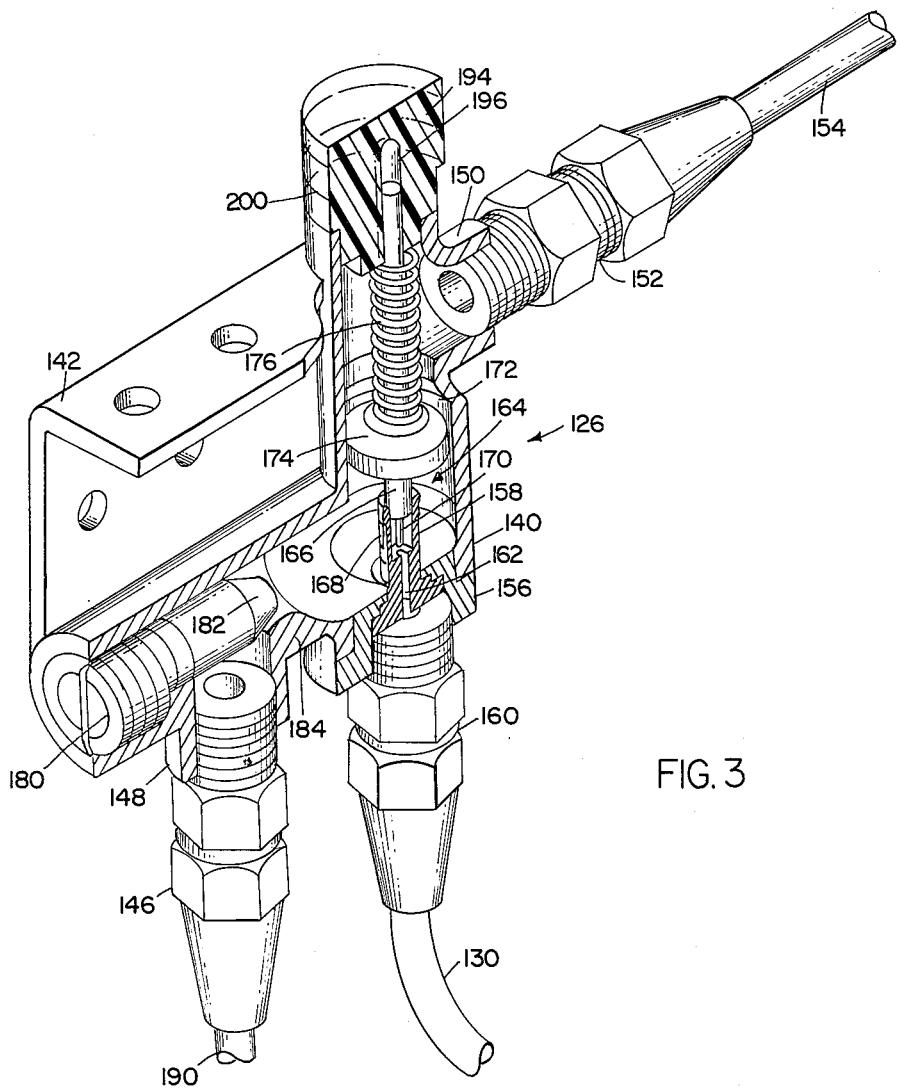
FIG. 3 is an enlarged cross sectional perspective view of the mixing valve shown in FIG. 2.

In the embodiment of this invention shown in FIGS. 2 and 3, the proportioning valve is used to introduce a corrosion preventative solution into the cooling system of a marine engine. In FIG. 2, the marine engine 110 suggested in outline is provided with an engine coolant pump 112 which takes water through duct 114 from the body of water in which the boat moves and directs it through the engine by means of duct 116. The differential pressure across the pump between the duct 114 and 116, is used as a source for the operation of the corrosion preventing installation. A portion of the water conveyed by the pump is bled off through tube 118 connected to duct 116 by connection 120. The amount of water bled by tube 118 may constitute approximately two to twenty percent of the total water moved by pump 112. A filter assembly (not shown) may be disposed in the duct 116 to filter water bled from that duct into the tube 118.

A T-connection 122 serves to direct a portion of the water taken from the duct 116 to tank 124 and a portion to the proportioning valve 126. The tank 124 is provided with a bag 128 containing the corrosion preventative solution. The bag 128 communicates with a tube 130 which is also connected at its other end to the proportioning valve 126. The tube 132 which directs a portion of the water from tube 118 to the tank 124 serves to apply line pressure to the tank 124 in precisely the same manner as employed in the embodiment of FIG. 1.

The proportioning valve 126 is shown in detail in FIG. 3. In that figure, the valve is shown to include a housing 140 supported on an integral bracket 142 in turn connected to the engine 110 by mounting bracket 144 (see FIG. 2). A tubing connection 146 is threaded into inlet fitting 148 and serves to introduce to the housing 140 a portion of the water bled from the duct 116 through tube 118. An outlet fitting 150 is formed at the other end of housing 140 and supports a tubing connection 152. In FIG. 2 it will be noted that the tubing connection 152 is secured to one end of tube 154 which is connected at its other end to the duct 114.

A collar 156 is held in the housing 140 and supports an upstanding sleeve 158 and a third tubing connection 160. The tubing connection 160 is connected to the end of tubing 130 used to convey the corrosion preventative solution stored within the bag 128 in the tank 124 to the proportioning valve housing 140. The lower portion of sleeve 158 is provided with an axially oriented metering orifice 162 in communication at its lower end with the tubing connection 160. The upper portion of the sleeve above the orifice 162 serves as a guide for needle assembly and cruise control valve 164. The lower end of rod 166 forming part of the assembly 164 rests in the upper end of the sleeve 158, and radial openings 168 are provided adjacent the top of the sleeve to permit the orifice 162 to communicate with the interior of the housing 140. Thus, when needle 170 carried on the lower end of rod 166 is removed from the orifice 162, corrosion preventative solution may flow from the tube 130 through the tubing connection 160 and orifice 162, and out the sleeve through passage 168 to the interior of the housing.

A valve seat 172 is formed in the upper portion of the housing 140 upstream of and adjacent to the fitting 150, and a valve 174 carried on the rod 166 is adapted to seat itself on the valve seat 172 to close communication between the interior of the housing 140 and the discharge fitting 150. A spring 176 supported on the upper end of the rod 166 urges the valve 174 off the seat 172 and at the same time urges the needle 170 on the rod 166 into the orifice 162.

As in the embodiment of FIG. 1, a pressure drop is created across the orifice 162 to cause the corrosion preventative solution to move from the tank 124 to the interior of the housing 140. The solution so introduced in the housing 140 is picked up by the main flow of water through the housing which enters through fitting 148 and discharges through fitting 150 to convey the solution to the point of application. An adjustment screw 180 is threaded into the housing 140 and is provided with a tapered shaft 182 which cooperates with a restricting ring 184 to create a low pressure region in the housing 140 at the location of the outlet end of orifice 162. By moving the adjustment screw to the left as shown in FIG. 3 the cross sectional area of the restriction formed by the collar 184 is enlarged to lessen the pressure drop between the inlet fitting 148 and the location of the orifice 162 and reduce the flow of solution from the tank 124 to the housing 140. The flow of corrosion preventative solution may be increased by moving the screw 180 to the right.

In operation, the system functions as follows. The pressure drop between the duct 116 and the duct 114 on the outlet and inlet sides of the pump 112 causes water to flow through the tube 118 where most of the water bled through the tube 118 is directed upwardly through duct 190 to the inlet side of housing 140. The tube 132 places the tank 124 in comunication with the water to apply the line pressure to the tank 124. The water which is directed by duct 190 through the housing 140 experiences a pressure drop across the tapered shaft 182 of the adjustment screw and that pressure drop is proportional to the pressure drop across the orifice 162. It will be recognized that the pressure on the inlet end of orifice 162 is equal to the pressure at the inlet fitting 148 of the housing. The pressure drop across the orifice 162 causes the corrosion preventative solution to flow to the housing 140 where it is picked up by the main flow of water and discharged with it through fitting 150, assuming of course that the needle 170 is removed from the orifice. To assure the flow of silicate from the bag 128 to the tube 130 under heavy seas and when the bag is only partially full, a flexible hose 198 carrying a weighted inlet nozzle 200 is disposed in the bag and communicates with the tube 130. The weighted nozzle 200 continuously seeks the bottom of the bag 128 to assure flow of the silicate when a low pressure region is created in the valve housing.

At a selected flow rate through the housing 140, the water pressure lifts the control valve 174 which causes the rod 166 to withdraw the needle 170 from the orifice 162. At a somewhat higher flow rate through the housing 140, the control valve 174 reaches the seat 172 and completely shuts off flow through the unit. The flow rate through the housing is determined by the pressure drop between ducts 116 and 114. Since the pump is directly connected to the engine 110 the pump flow increases as engine speed increases and therefore the flow through the tubing 118 and 190 and housing 140 increases. When the valve 174 closes, no corrosion preventative solution is fed from the tank 124 to the housing 140. Thus, the system only serves to add solution at lower speeds and cuts out when the engine reaches cruising speed. This action conserves the corrosion preventative solution but nevertheless gives the necessary protection against corrosion. The speed at which cut out occurs may be controlled by the adjustment screw 180 as that screw serves to control the water pressure in the housing applied to the valve 174.

A cap 194 is supported on top of the housing 140 and is provided with a central bore 196 which guides the upper end of the rod 166. By making the cap 194 of transparent material, the mechanic who installs and adjusts the unit can observe the action of the cruise control valve 174. A scored line 202 in the cap indicates the position of the top of the rod 166 when valve 174 is closed.

It will be noted in the foregoing description of the marine application that the main coolant flow through the pump 112 will not be affected by any malfunctioning of the proportioning valve 126. Should the valve 126 become clogged so as to reduce or eliminate flow through the system, the engine will continue to be cooled by the action of the pump 112 driving liquid from the duct 114 to the duct 116.

From the foregoing description those skilled in the art will appreciate that numerous modifications may be made of the illustrated embodiments without departing from the spirit of this invention. Therefore, it is not intended that the breadth of this invention be limited to those embodiments specifically illustrated. Rather, it is intended that the breadth of this invention be determined by the appended claims and their equivalents.

What is claimed is:

1. A proportioning valve comprising a housing having a frusto-conical shaped section, a tapered sleeve disposed in said section and defining with it an annular passage in the housing, a main liquid inlet formed in the housing on one side of the sleeve an outlet formed in the housing on the other side of said sleeve, means for directing a main liquid through the housing via said inlet and said outlet, means for moving said sleeve in the frusto-conical section of the housing to vary the cross sectional area of the passage so as to vary the pressure drop in the housing across the sleeve from the upstream to the downstream side thereof while maintaining laminar flow through said section, an orifice formed in the wall of the housing immediately downstream of said sleeve, means for connecting a supply of material to the housing through the orifice so as to introduce said material to the main liquid, and means including a second outlet formed in the housing upstream of the sleeve for bleeding off a portion of the liquid directed through the housing at the pressure of the liquid upstream of the sleeve and applying that pressure to the supply of material.

2. A proportioning valve comprising a housing having an axially extending central portion, a first pair of radially aligned passages in the housing at one end of the portion and a second pair of radially aligned passages at the other end of the portion, means for directing a liquid into the housing through a passage of the first pair and discharging the liquid from the housing through a passage of the second pair, a restrictor movable in the central portion of the housing for creating a variable pressure drop across the housing from the first pair to the second pair of passages, means for introducing a second liquid into the other of the second pair of passages at the low pressure side of the restrictor, and means for directing liquid from the housing out the other of the first pair of passages to apply the pressure of the first liquid to the second liquid outside the housing.

3. Apparatus comprising a main line through which a primary liquid flows, a restrictor disposed in the line interrupting the flow of primary liquid and creating a pressure drop in the line across the restrictor, an orifice in the line at the region of lower pressure downstream of the restrictor for connecting a source of a second liquid to be added to the primary liquid, an opening in the main line at the region of higher pressure upstream of the restrictor for applying the higher pressure in the line at that region to the source of the second liquid outside the line to induce flow of the second liquid through the orifice, a needle carrier disposed in the line of the primary liquid, a needle attached to the carrier, means biasing the carrier to a position wherein the needle is disposed in and cleans the orifice, and means responsive to the flow of primary liquid for moving the needle out of the orifice.

4. Apparatus comprising a main liquid line, a housing in the main line through which the main liquid flows, a restrictor disposed in the housing in the path of the main liquid and establishing a pressure drop in the housing across the restrictor proportional to the flow rate of the liquid therethrough, an orifice in the wall of the housing adjacent the downstream side of the restrictor for connecting a source of a second liquid to be added to the main liquid, an opening in the wall of the housing adjacent the upstream side of the restrictor for applying the pressure of the liquid just upstream of the restrictor to the second liquid outside the orifice to induce flow of the second liquid through the orifice, said restrictor having a frusto-conical shaped body and said housing having a section of the same shape and surrounding the restrictor body, and means for adjusting the position of the restrictor in the section to vary the cross sectional area of the path for the flow of the main liquid through the housing.

5. Apparatus as defined in claim 4 further characterized by a needle carrier disposed in said housing, a needle attached to the carrier, means biasing the carrier to a position wherein the needle is disposed in and cleans the orifice, and means responsive to the flow of the main liquid through the housing for moving the needle out of the orifice.

6. Apparatus for directing a corrosion resistant material into the liquid cooling system of a marine engine comprising a tank, corrosion resisting material stored in the tank, a bleed adapted to connect the cooling system and the tank for applying pressure to the tank, a proportioning valve having a housing, a second bleed connecting the cooling system to the housing for directing liquid from the system to the housing, means including an orifice formed in the wall of the housing interconnecting the tank and the housing for conveying the material to said housing, a restrictor disposed in the housing creating a low pressure region at the orifice for inducing flow of the corrosion resistant material into the housing from the tank, means for directing the contents of the housing to the cooling system, a valve disposed in the housing and movable in response to a preselected maximum flow rate through the housing for stopping flow through the housing, and a needle disposed in the housing and carried by the valve and biased to a position wherein the needle is disposed in and cleans the orifice, said valve removing the needle from the orifice in response to flow of the cooling liquid through the housing exceeding a preselected minimum rate.

7. A proportioning valve comprising a housing having a central portion, a first pair of passages in the housing at one end of the portion and a second pair of passages at the other end of the portion, means for directing a liquid into the housing through a passage of the first pair and discharging the liquid from the housing through a passage of the second pair, a restrictor movable in the central portion of the housing for creating a variable pressure drop across the housing from the first pair to the second pair of passages, means for introducing a second liquid into the other of the second pair of passages at the low pressure side of the restrictor, and means for directing liquid from the housing out the other of the first pair of passages to apply the pressure of the first liquid to the second liquid outside the housing.

8. Apparatus as defined in claim 3 further characterized by a tank for storing the second liquid to be added to the primary liquid, means connecting the tank to the orifice enabling the second liquid to pass to said orifice, and means including a duct connecting the opening to the tank whereby the higher pressure of the main line upstream of the restrictor may be applied to the second liquid in the tank.

9. A proportioning valve comprising a housing, a restrictor disposed in the housing and defining with it a passage in the housing, a main liquid inlet formed in the housing on one side of the restrictor, an outlet formed in the housing on the other side of said restrictor, means for directing a main line liquid through the housing via said inlet and said outlet, means operatively associated with the restrictor to vary the cross sectional area of the passage so as to vary the pressure drop in the housing across the restrictor from the upstream to the downstream sides thereof while maintaining laminar flow through the passage, an orifice formed in the wall of the housing immediately downstream of said restrictor, means for connecting a supply of material to the housing through the orifice so as to introduce said material to the main liquid, and means including a second outlet formed in the housing upstream of the restrictor for bleeding off a portion of the liquid directed through the housing at the pressure of the liquid upstream of the restrictor and applying that pressure to the supply of material.

10. Apparatus comprising a main line through which a primary liquid flows, a restrictor disposed in the line interrupting the flow of primary liquid and creating a pressure drop in the line across the restrictor, an orifice in the line at the region of lower pressure downstream of the restrictor for connecting a source of a second liquid to be added to the primary liquid, an opening in the main line at the region of higher pressure upstream of the restrictor for applying the higher pressure in the line at that region to the source of the second liquid outside the line to induce flow of the second liquid through the orifice, and means disposed in the main line and responsive to changes in flow rate of the primary liquid for cleaning the orifice.

References Cited in the file of this patent

UNITED STATES PATENTS

| 2,004,869 | Hogg | June 11, 1935 |
| 2,592,304 | Lubeley | Apr. 8, 1952 |
| 2,594,519 | Thurber et al. | Apr. 29, 1952 |
| 2,984,250 | Foster et al. | May 16, 1961 |

FOREIGN PATENTS

| 1,169,557 | France | Sept. 15, 1958 |